(12) United States Patent
Brussels

(10) Patent No.: US 6,381,153 B1
(45) Date of Patent: Apr. 30, 2002

(54) METHOD AND APPARATUS OF EMI FILTERING THAT ELIMINATES THE NEED FOR AN INDUCTOR

(75) Inventor: Jay D. Brussels, Parkland, FL (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 09/295,490

(22) Filed: Apr. 20, 1999

(51) Int. Cl.[7] .................................................. H02M 1/12

(52) U.S. Cl. ...................................................... 363/39

(58) Field of Search ............................ 363/39, 45, 46, 363/47, 48; 361/302

(56) References Cited

U.S. PATENT DOCUMENTS

| | | |
|---|---|---|
| 4,178,617 A | 12/1979 | Reichel |
| 4,200,104 A * | 4/1980 | Harris .......................... 606/35 |
| 4,342,013 A * | 7/1982 | Kallman ...................... 333/181 |
| 4,394,784 A | 7/1983 | Swenson et al. |
| 4,429,241 A | 1/1984 | Ohara et al. |
| 4,488,201 A | 12/1984 | Webb et al. |
| 4,761,623 A | 8/1988 | Schneider |
| 4,795,951 A | 1/1989 | Gaebel et al. |
| 5,126,642 A * | 6/1992 | Shahrodi ..................... 318/433 |
| 5,483,136 A * | 1/1996 | Marcinkiewicz ............ 318/558 |
| 6,021,499 A * | 2/2000 | Aleshi ......................... 713/300 |
| 6,100,605 A * | 8/2000 | Zajkowski .................... 307/66 |
| 6,104,161 A * | 8/2000 | Chung et al. ............... 320/109 |

FOREIGN PATENT DOCUMENTS

| | | |
|---|---|---|
| DE | 35 38 949 A | 5/1987 |
| DE | 198 04 369 | 8/1999 |

OTHER PUBLICATIONS

TF Series—High Performance Low Leakage Switch Mode EMI Filter, downloaded from Filter Concepts, Inc. website at HTTP://www.filterconcepts.com/ac/tf series.html on Apr. 12, 1999, two pages.
Medical Applications LM Series, downloaded from Filter Concepts, Inc. website at HTTP://www.filterconcepts.com/ac/lm series.html on Apr. 12, 1999, two pages.
SF Series High Performance Switch Mode EMI Filter, downloaded from Filter Concepts, Inc. website at HTTP://www.filterconcepts.com/ac/sf series.html on Apr. 12, 1999, two pages.
LF Series—High Performance Low Leakage Switch Mode EMI Filter, downloaded from Filter Concepts, Inc. website at HTTP://www.filterconcepts.com/ac/lff series.html on Apr. 12, 1999, two pages.
Q–Series Filter Selection Table, downloaded from Entstören corcom GMBH website at HTTP://www.cor.com/germany/catalog/q/qhtm on Apr. 12, 1999, eight pages.
EMC Conducted Emissions measurement by David Mawdsley, downloaded from Laplace Instruments Ltd. website at HTTP://www.emcnet.com/papers/emodtctr.html on Apr. 12, 1999, seven pages.
X2Y Technology Overview, downloaded from Syfer Technology, Ltd. website at HTTP://www.x2y.com/tech–overview.htm on Apr. 13, 1999, two pages.

* cited by examiner

Primary Examiner—Adolf Deneke Berhane
(74) Attorney, Agent, or Firm—Barnes & Thornburg

(57) ABSTRACT

An EMI filter for use with a motor driven blower connectable to an inflatable portion of a patient support powered by two supply lines includes a blower ground isolated from a chassis ground, a first capacitor coupling the blower ground and one of the two supply lines, a second capacitor coupling the blower ground and the other of the two supply lines so that the first and second capacitors cooperate to filter common mode EMI without the aid of an inductor.

14 Claims, 6 Drawing Sheets

METHOD AND APPARATUS OF EMI FILTERING THAT ELIMINATES THE NEED FOR AN INDUCTOR

BACKGROUND AND SUMMARY OF THE INVENTION

This application relates to power supplies for motors, and more particularly to a power supply for a motor of a blower used in a healthcare environment which filters Electromagnetic Interference EMI emissions and reduces ground current leakage.

Recently hospitals have been replacing standard mattresses and patient support apparatus with air inflatable, low air loss, and/or fluidized mattresses which require the use of an air supply incorporating a blower to maintain proper pressure levels. These blowers are typically operated using motors driven by power conversion circuits which generate unwanted signals. These unwanted signals can affect, or interfere with, other electronic systems and with the control system of the blower itself. These effects of the unwanted signals are commonly called electromagnetic interference (EMI) which is also known as radio frequency interference (RFI). EMI emissions can be transmitted by radiation through space or by conduction along supply lines.

Many electrical systems are susceptible to EMI. In the hospital environment EMI emissions can adversely affect critical equipment causing catastrophic results. Some evidence indicates that EMI emissions can cause electric powered wheelchairs to exhibit erratic behavior, cause incorrect readings from adult heart monitors leading to improperly administered defibrillation, cause failure of alarms in apnea monitors and infant heart monitors, and induce ventilators to change their breath rates.

In the United States EMI emission standards are set by the Federal Communication Commission (FCC). The FCC has promulgated standards of permissible radiated and conducted radio frequency emissions for common commercial products as well as products intended for commercial or industrial use in The FCC Rules and Regulations, Part 15, Subpart B. The radiated and conducted test procedures are defined in ANSI Standard C63.4. The Food and Drug Administration (FDA) through its Center for Devices and Radiological Health (CDRH) has also considered promulgating standards for devices to be used in hospital environments and has worked to heighten EMI awareness among medical device manufactures. The FDA also requires immunity testing for medical equipment. The European Economic Community has adopted standards governing not only EMI emissions, but also EMI susceptibility, of electronic devices. Compliance with EEC's conducted EMI emissions is established by passing Underwriters Laboratory (UL) EN55011 Class A emissions test. In order to comply with all of the standards promulgated by the FCC, electronic devices incorporate electromagnetic compatibility (EMC) systems.

EMI is created by rapid variations of voltages or currents within a system. The magnitude of the EMI depends on the value of the current, the length of the conductors, the rate of change of voltage and current, and the physical position of the conductors relative to each other and any earth planes. In blowers, the rapid variations can be caused by, among other things, the arcing of motor commutators (when motors with commutators are used) or the rapid switching of the motor controller components. One method of reducing conducted EMI emissions is to introduce an EMI line filter between the main supply lines and the load. These filters use a circuit combining inductors and capacitors (LC circuit) to reduce the EMI emissions of the system. The capacitors of the LC filter circuits are typically connected between the supply lines and earth ground. While the LC filter circuit effectively reduces EMI emissions, it also generates a ground leakage current across the capacitors.

Ground leakage current in medical devices is also regulated by the FDA. Medical patients often have direct and intentional contact with medical equipment which could result in the ground leakage current flowing through the patient to ground. Thus standard LC filters are not adapted for use in medical equipment because of the serious hazard they pose to patient safety. Stringent EMC specifications are imposed upon equipment used in the medical industry, with even higher specifications being imposed on equipment classified in the "patient contact" category.

Special EMI line filters have been developed for use with medical equipment which reduce or eliminate ground leakage current. Among the medical application EMI filters are the LM series of EMI filters available from Filter Concepts, Inc. of Santa Ana, Calif., USA and the EHQ series of EMI Filters available from Corcom, GmbH in Martinsried, Germany a wholly owned subsidiary of CII Technologies Corcom Division. Both of these filters' circuitry include a plurality of inductors, a plurality of capacitors, and one or more resistors connected between the line and the load.

According to the present invention an EMI filter for use with a motor driven blower connectable to an inflatable portion of a patient support powered by two supply lines includes a blower ground isolated from chassis ground and earth ground, a first capacitor extending between and directly connected to the blower ground and one of the two supply lines, and a second capacitor extending between and directly connected to the blower ground and the other of the two supply lines. The EMI filter may also include a third capacitor extending between and directly connected to both of the two supply lines.

According to the present invention, a portable air supply unit powered by a supply having two current carrying lines and connectable to an inflatable patient supporting apparatus includes a chassis having an electrical potential defining chassis ground, an electrically powered blower received in the chassis and connected to each of the two supply lines, insulation and shielding isolating the blower from the chassis to define an electrical potential of the blower defining blower ground, a first capacitor extending between and connected to one of the two supply lines and blower ground, and a second capacitor extending between and connected to the other of the two supply lines and blower ground. The portable air supply might also include a third capacitor extending between the two supply lines.

A method of reducing conductive EMI emissions and ground leakage current of a blower for medical equipment powered by a two line current supply includes the steps of connecting a blower for operation to the two line power supply, providing a chassis, isolating the blower from the chassis to define a blower ground isolated from chassis ground, capacitively coupling each of the supply lines to blower ground.

Additional features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
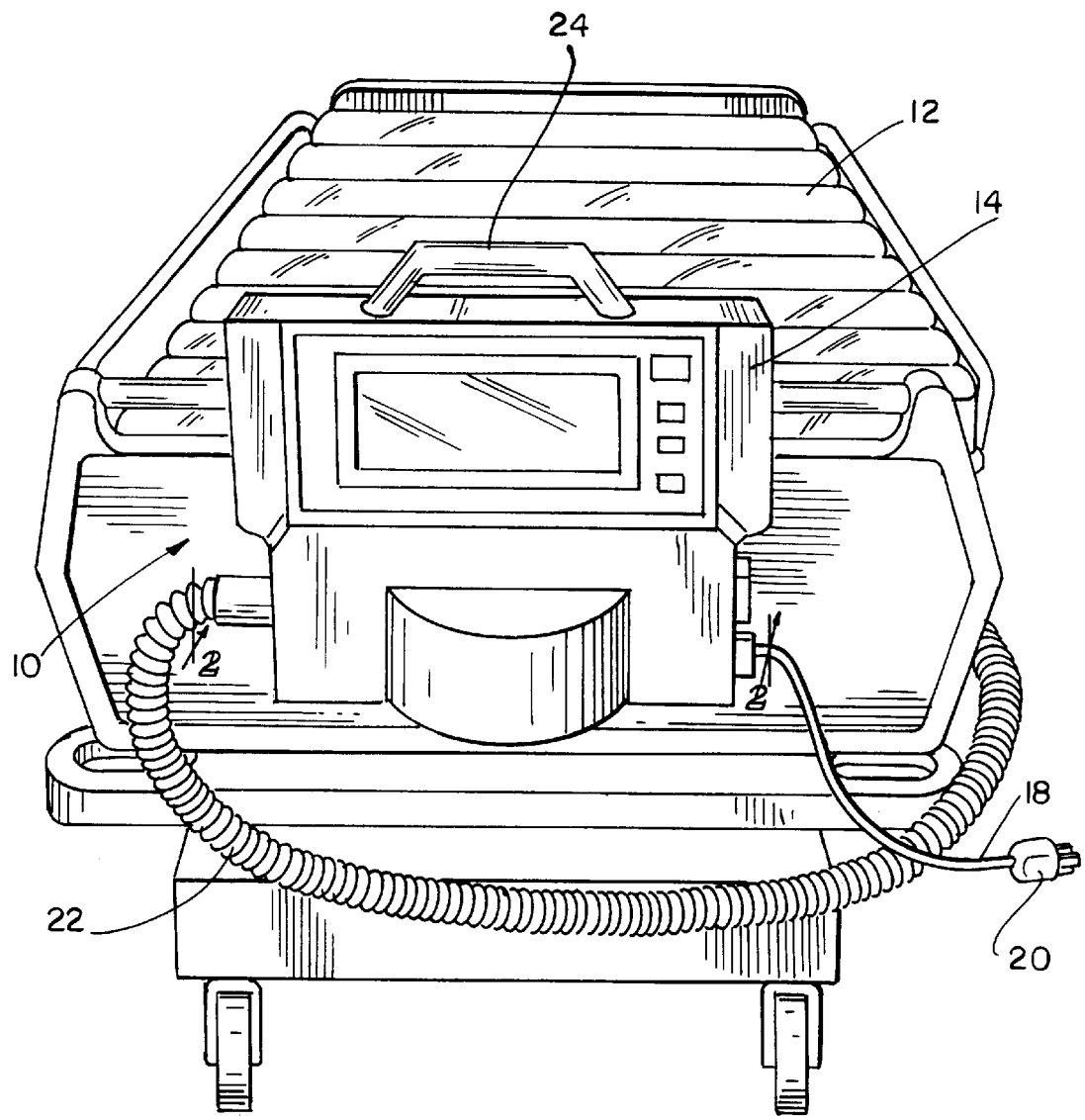
FIG. 1 is a perspective view of a portable air supply in accordance with the present invention showing a two piece housing, a handle connected to the housing, a hose extending from the housing for connection to an inflatable patient support, and a cord having a plug extending from the housing for connection to a power source.

An air supply 10 for providing pressurized air to a patient-supporting surface 12 is shown in FIGS. 1–4. Air supply 10 includes a housing or chassis 14 containing a blower 16. Extending through the housing 14 are a power cord 18 having a plug 20 for connection to a power supply line (not shown) and an air hose 22 for connection to the patient-supporting device 12. Housing 14 is formed to include a handle 24 to facilitate movement of air supply 10 by a caregiver.

Figure 2:
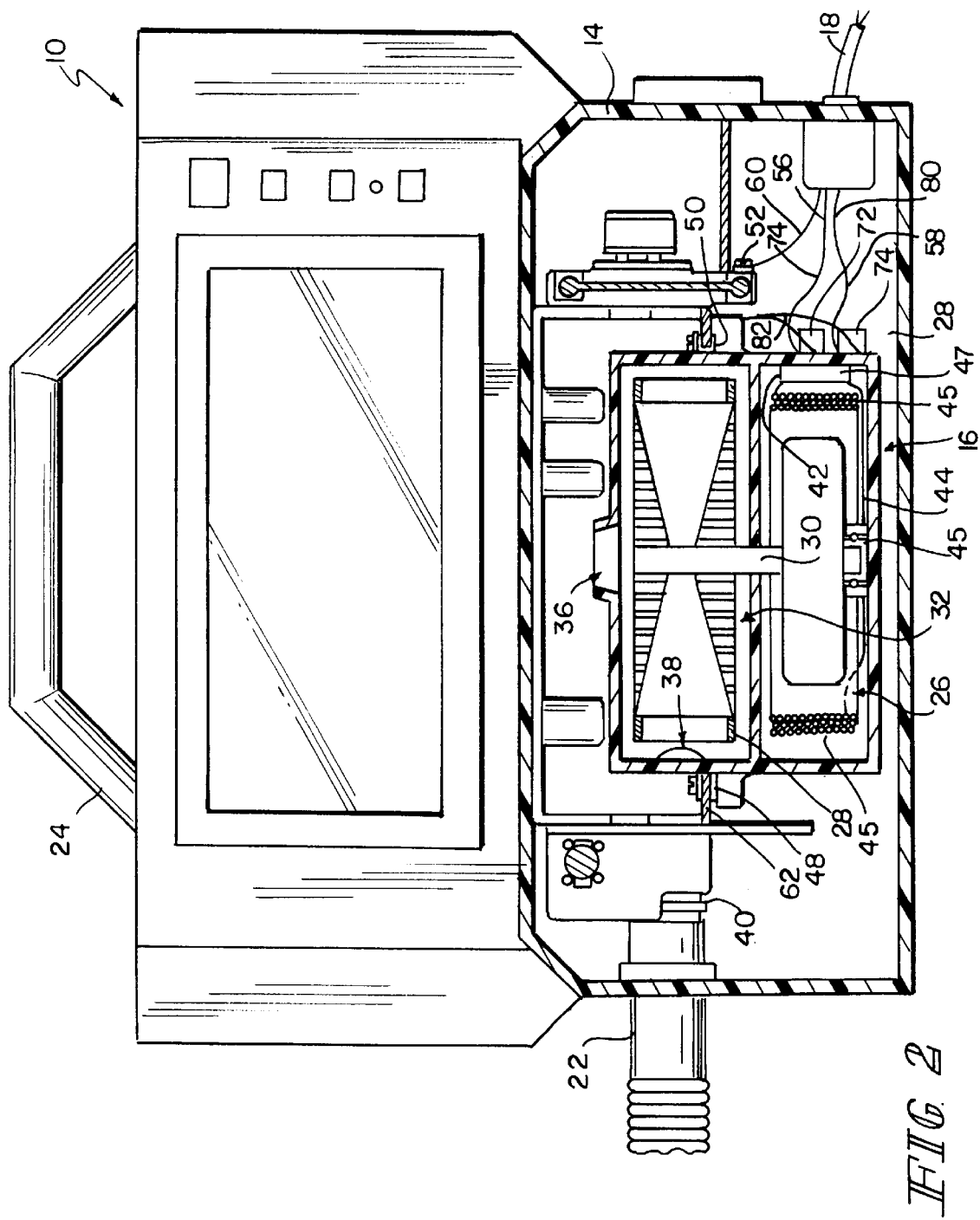
FIG. 2 is a sectional view along line 2—2 of FIG. 1 showing the interior of the housing of the air supply showing a mounting frame to which a blower having a turbine received in a chamber attached, a motor drivably connected to the turbine and connected to two current carrying lines coupled to the power cord, and the hose connected to the chamber.
Figure 3:
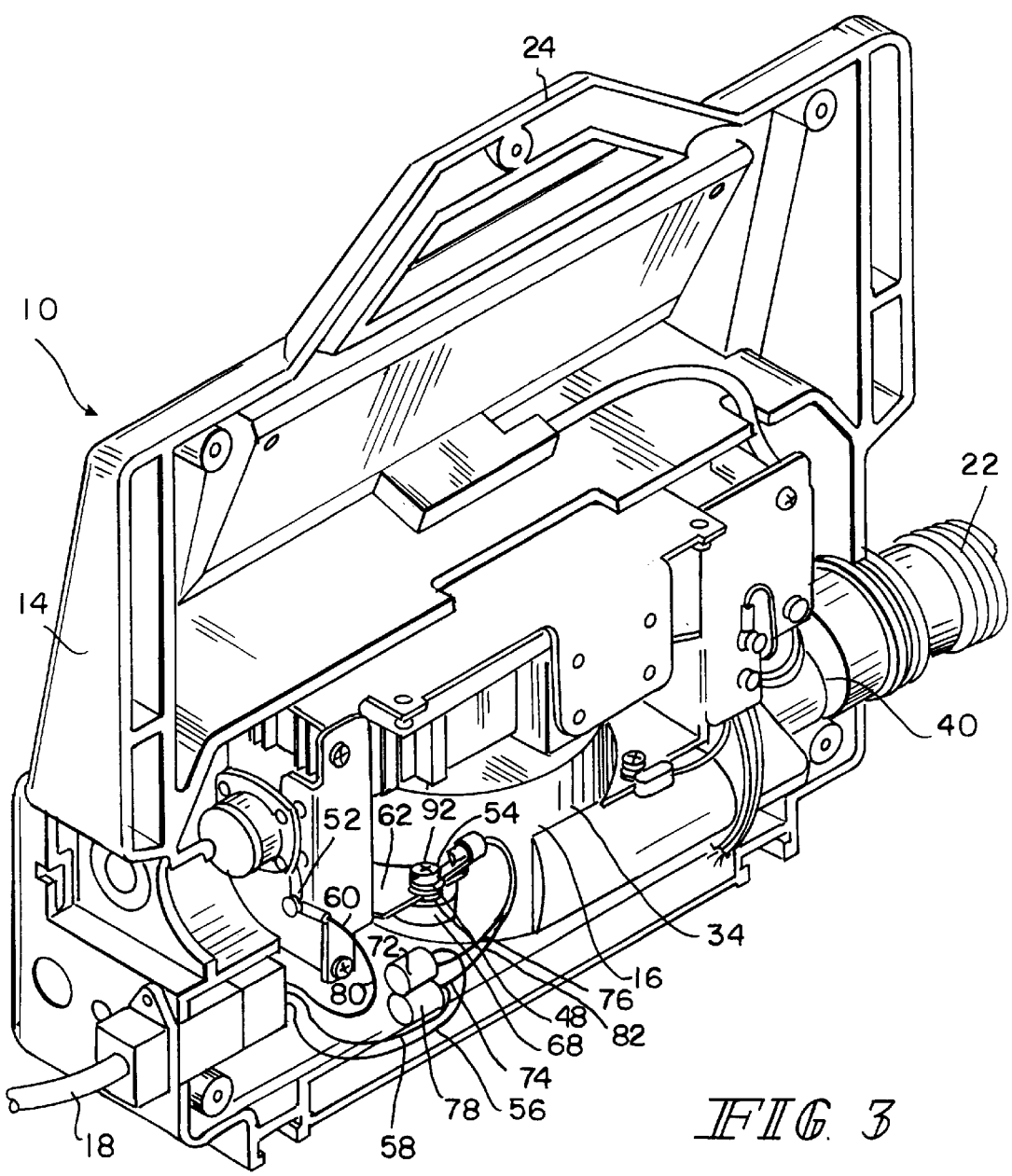
FIG. 3 is a rear perspective view of the air supply of FIG. 1 with the rear housing piece removed (and some wires eliminated for clarity sake) to show the blower connected to the mounting bracket, isolation material isolating the blower from the mounting bracket so that the potential of the blower differs from the potential of the mounting bracket to define a blower ground and a chassis ground, a first capacitor extending between and capacitively coupling one of the two power lines and the blower ground, and a second capacitor extending between and capacitively coupling the other power line and the chassis ground.

As shown in FIG. 2, blower 16 includes a motor 26 and a turbine 28 connected to the shaft 30 of the motor 26 and received in a chamber 32 formed in case 34. The chamber 32 is formed to include a supply opening 36 communicating with the atmosphere and an outlet 38 for connection to the internal end 40 of air hose 22. Illustratively, blower 16 is a DC 120V blower 16 available from Ametek Rotron Technical Motor Division of Kent, Ohio. Motor 26 includes two leads 42, 44 connected to motor controller 47 which is also connected to internal end 46 of power cord 18 to provide current to the windings 45 of motor 26.

Blower 16 is connected to mounting bracket 62 which is attached to housing 14. In the illustrated embodiment, housing 14 is manufactured from non-conductive plastic material. Mounting bracket 62 is manufactured from metallic, or other conductive material and is coupled to ground wire 60 of power cord 18. Thus mounting bracket 62 is at the same potential as earth ground and acts as a chassis ground. Mounting bracket 62 includes a mounting ring 64 formed to include a blower-receiving aperture 66. Mounting ring 64 is also formed to include four mounting holes 65 extending therethrough.

Case 34 of blower 16 is also manufactured from metallic material or other conducting material. Illustratively, case 34 is formed to include four mounting ears 68. Mounting ears 68 are formed to include threaded mounting holes 90 for receipt of mounting screws 92.

Blower case 34 is received within blower-receiving aperture 66 of mounting ring 64. Blower case 34 is spaced apart from mounting ring 64. Blower 16 is also isolated from mounting bracket 62 by isolation medium 46. Isolation medium 46 includes shoulder washers or grommets 48 made from non-conducting material to isolate blower 16 from mounting bracket 62. Illustratively, grommet 48 is made from Nylon 6/6, RMS-48 and is available from Richco, Co., Chicago, Ill. as part no. MNI #10-4.

Figures 4, 5:
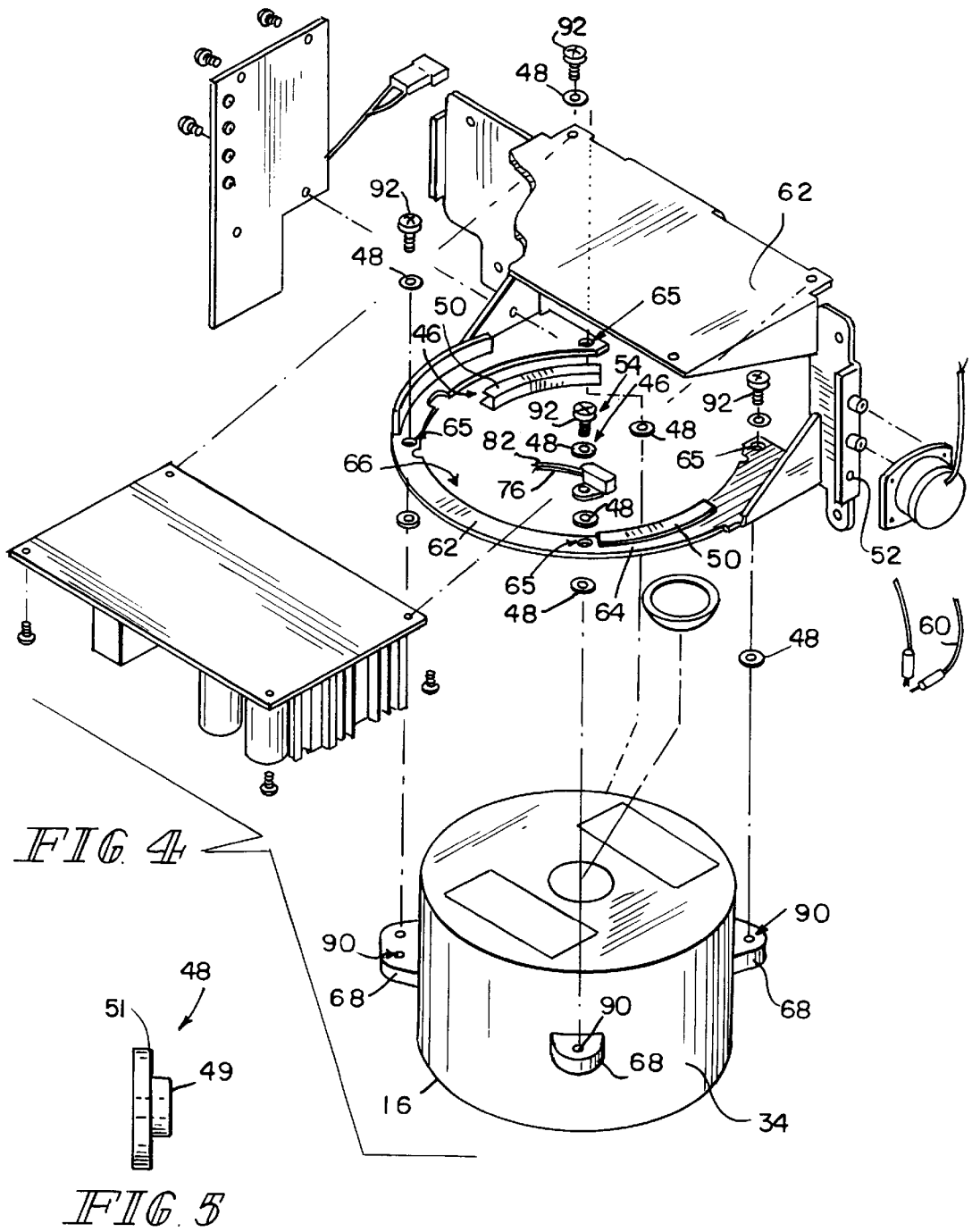
FIG. 4 is an exploded view of the mounting bracket and blower showing grommets for isolating the blower from the mounting bracket.
FIG. 5 is a side elevation view of a grommet used in the air supply of FIG. 1 to isolate the blower case from the mounting bracket.

As shown, for example in FIG. 5, grommet includes a ring-shaped shoulder 49 extending from a disk-shaped body 51. Mounting holes 65 in mounting ring 66 are sized to receive shoulder 49 of grommet 48. As shown in FIG. 4, at each mounting hole 65 two grommets 48 are located with shoulder 49 extending into mounting hole 65. Disk 51 of lower grommet 48 insulates mounting ring 66 from mounting ear 68. Mounting screw 92 is inserted through both grommets 48 at each mounting hole 65 and screwed into threaded mounting holes 90 in ears 68. It will be understood that the shaft of mounting screw 92 is insulated from mounting ring 64 by shoulder 49 of grommet 48 while the head of mounting screw 92 is insulated from mounting ring 66 by disk 51 of grommet 48.

Illustratively isolation medium 46 also includes caterpillar edging 50 which raps around portions of the interior edge of mounting ring 64 to further insulate case 34 from mounting bracket 62. Isolation medium 46 may also include plastic mounting brackets, insulated standoffs, or other mounting hardware that will insulate blower case 34 from chassis ground 52 within the teaching of this disclosure. In the illustrated embodiment, it is understood that isolation medium 46 insulates blower case 34 from mounting bracket 62 so that blower case 34 and mounting bracket 62 exhibit independent potentials relative to earth ground. Therefore, air supply 10 includes a chassis ground 52 and an independent blower ground 54.

Power cord 18 typically includes two current carrying conductors or supply lines 56, 58 with varying voltage potentials relative to a separate ground conductor 60. Ground conductor 60 is typically connected to a chassis ground bus which in this case is mounting bracket 62. Ground conductor 60 is also connected through the power distribution network to earth ground. Thus, chassis ground 52 typically has a zero potential relative to earth ground.

Figure 6:
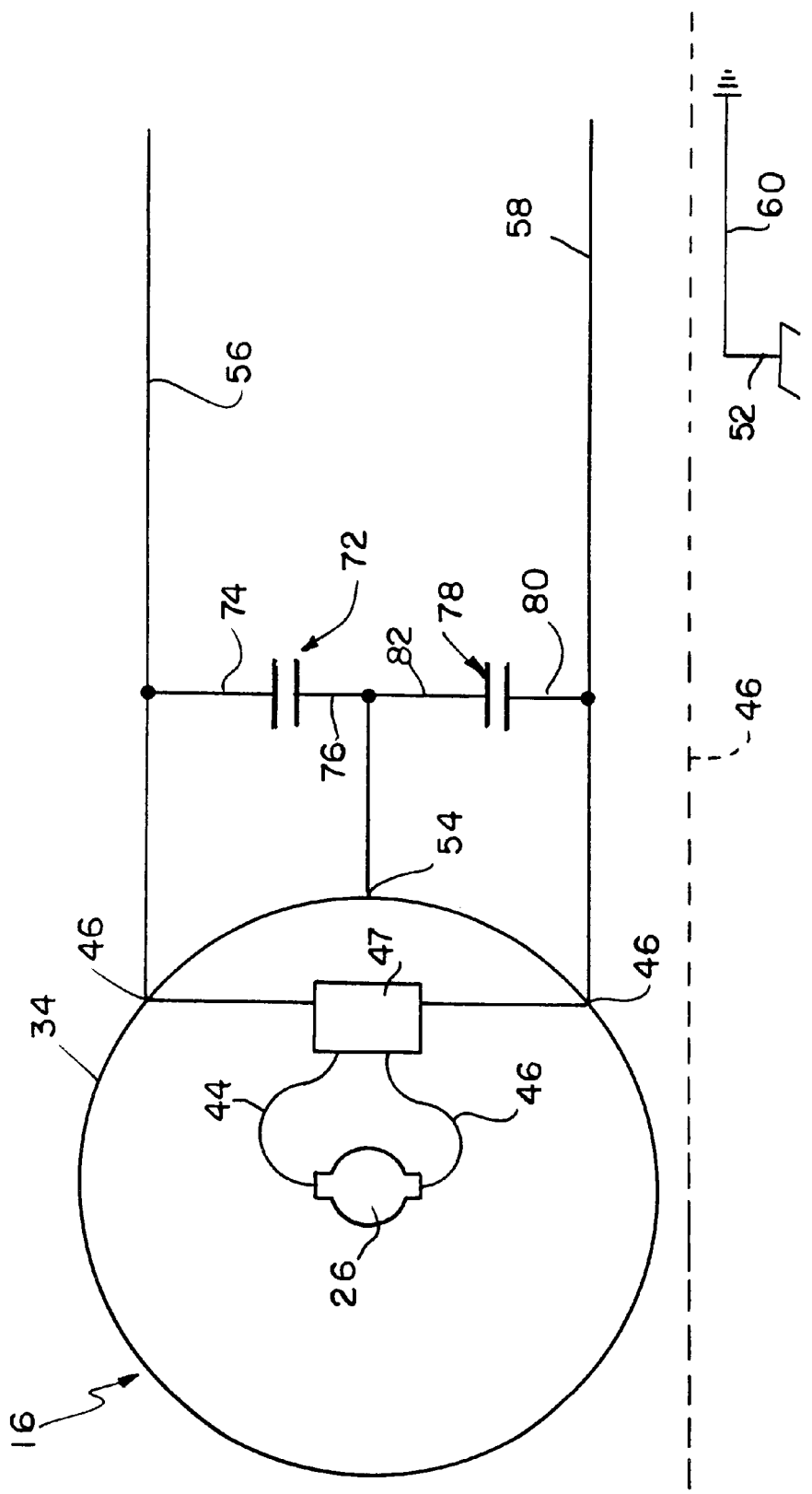
FIG. 6 is a schematic diagram of an EMI filter between the power supply and the blower showing the first and second capacitors connected as described with respect to FIG. 3.
Figure 7:
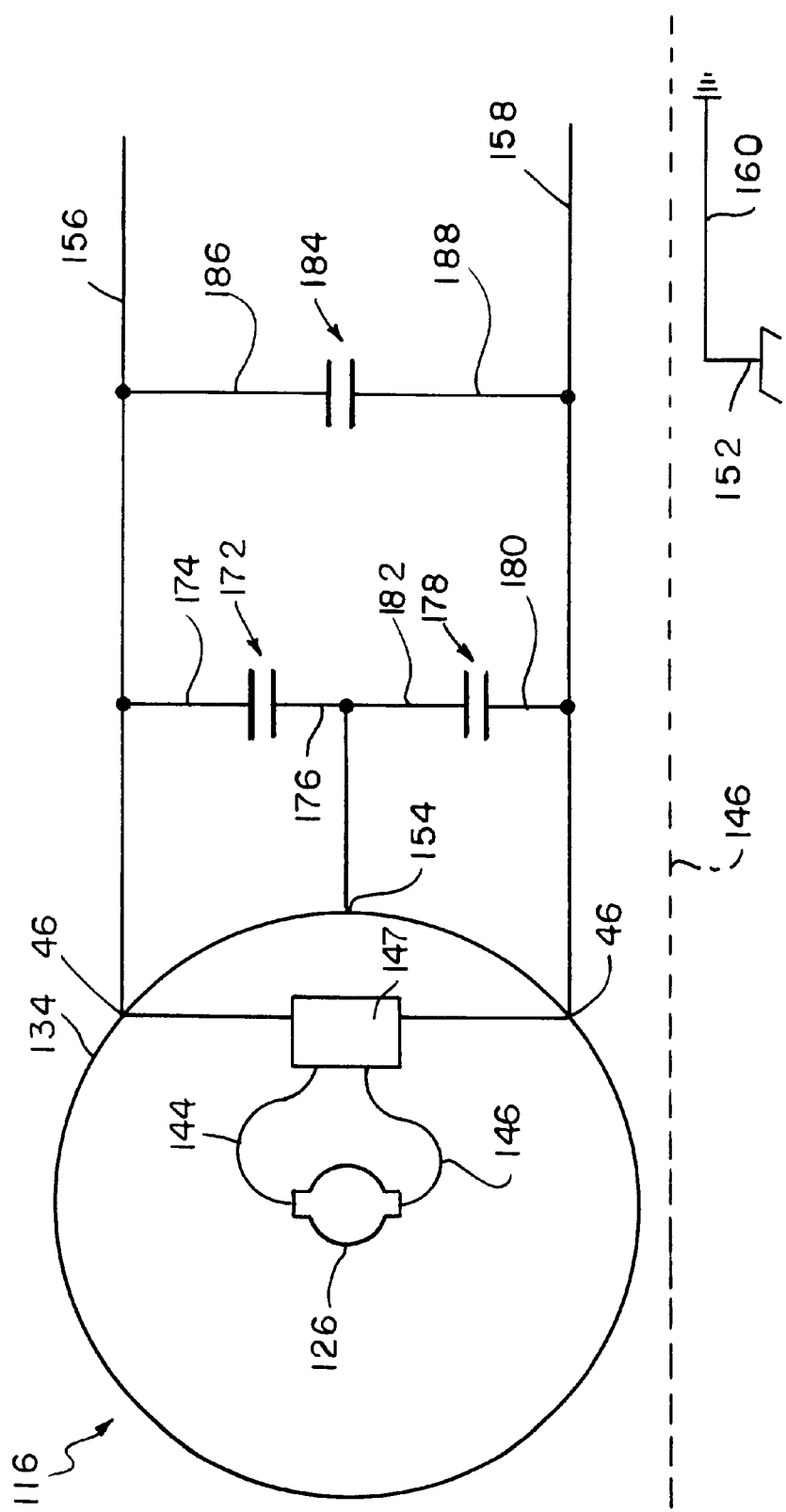
FIG. 7 is a schematic diagram of an alternative EMI filter of the present invention showing a first capacitor coupling one of the power lines to the blower ground, a second capacitor coupling the other of the power lines to the blower ground, a third capacitor extending between and capacitively coupling the two power lines, and a ground line extending from the power supply coupled to earth ground and a separate chassis ground isolated from the blower ground.

An EMI filter 70 is disposed between supply lines 56, 58 and blower ground 54. EMI filter 70 includes a first capacitor 72 having a supply lead 74 and a ground lead 76 and a second capacitor 78 having a supply lead 80 and a ground lead 82. Supply lead 74 of first capacitor 72 is coupled to one of the two supply lines 56, 58 and ground lead 76 of first capacitor 72 is coupled to blower ground 54, as shown, for example, in FIGS. 2, 3 and 6. Similarly, supply lead 80 of second capacitor 78 is coupled to the other of the two supply leads 58, 56 and ground lead 82 is coupled to blower ground 54. Illustratively, first capacitor 72 and second capacitor 78 have capacitances in the range 0.1 $\mu$F to 1 $\mu$F and are rated for 250 VAC. In air supply 10, first and second capacitors 72, 78 are 0.1 $\mu$F 250 VAC EMI filter capacitors. Capacitors 72, 74 are of the type commonly referred to as polyester film molded capacitors.

Since motor 26 of the illustrated blower is a D.C. brushless motor, motor commutator arcing plays no part in generating EMI. In illustrated air supply EMI is generated by motor controller 47. Motor controller is received in blower case 34 and enclosed therein. Blower case 34 is made of metal and therefore acts as a Faraday cage to virtually eliminate radiated EMI.

Conducted EMI is generated by motor controller 47 and carried out of blower case along supply lines 56, 58. In the embodiment illustrated and described, motor controller 47 contains an internal capacitor (not shown) extending between the conductors coupled to lines 56, 58. This internal capacitor of motor controller 47 acts to filter out differential mode conducted EMI.

Common mode conducted EMI is not filtered by the internal capacitor and is carried away from housing on lines 56, 58. Common mode conducted EMI is filtered in the illustrated design by first capacitor 72 and second capacitor 78 which are coupled to blower ground 54.

Normally capacitors which reduce common mode conducted EMI generate ground leakage current to the chassis ground. Ground current leakage is highly regulated in medical equipment which may come into contact with a patient to help reduce risks of electrical shock. In illustrated device, blower ground 54 is isolated from chassis ground 52 so that any ground leakage current created by first and second capacitors 72, 78 does not present a shock hazard to a patient. Additionally by isolating blower ground 54 from chassis ground 52 and using blower ground 54 as the sink for conducted EMI signals, the need for heavy, expensive, or bulky inductors in the EMI filter has been eliminated.

An alternative filter 170 for use with a blower 116 rated at 240 V supplied by main supply lines 156, 158 carrying 220 V A.C. includes a first capacitor 172 and a second capacitor 178 connected as previously described. EMI filter 170 also includes a third capacitor 184 having a first lead 186 and a second lead 188. First lead 186 is connected to one of the main supply lines 156, 158 and second lead 188 is connected to the other of the main supply lines 158, 156. Third capacitor 184 replaces internal capacitor of EMI filter 70 to filter differential EMI in filter 170. Illustratively, first, second, and third capacitors 132, 176, 184 are 1 $\mu$F 250 VAC polyester film molded capacitors.

It will be understood that the disclosed EMI filters 70, 170 include substantially less components than prior art medical EMI filters. Reduction of the number of components in the EMI filter decreases the size, weight, and cost of the medical device. The weight reduction also facilitates portability of the device. It should also be understood that since motor controller is received within case 34, it is shielded by case from radiated EMI generated by other devices.

Although the invention has been described in detail with reference to a certain illustrated embodiment, variations and modifications exist within the scope and spirit of the invention as described and defined in the following claims.

What is claimed is:

1. An EMI filter for use with a motor driven blower connectable to an inflatable portion of a patient support powered by two supply lines comprising:
   a blower ground isolated from a chassis ground,
   a first capacitor coupling the blower ground and one of the two supply lines,
   a second capacitor coupling the blower ground and the other of the two supply lines, and
   wherein the first and second capacitors cooperate to filter common mode EMI without the aid of an inductor.

2. The apparatus of claim 1, further comprising a third capacitor coupling the two supply lines.

3. The apparatus of claim 1, wherein the first capacitor extends between and directly connects blower ground to one of the two supply lines.

4. The apparatus of claim 2, wherein the second capacitor extends between and directly connects blower ground to the other of the two supply lines.

5. The apparatus of claim 4, further comprising a mounting bracket at chassis ground potential and a blower case at blower ground potential.

6. The apparatus of claim 5, further comprising a motor controller received within the blower case, the blower case being configured to reduce radiated EMI originating from within its interior.

7. A portable air supply unit powered by a supply having two current carrying lines and a ground line and connectable to an inflatable patient-supporting apparatus comprising:
   a housing having an electrical potential defining a chassis ground,
   an electrically powered blower received in the housing and connected to each of the two supply lines,
   an isolating medium isolating the blower from the housing to define an electrical potential of the blower defining blower ground having an electrical potential distinct from chassis ground,
   a first capacitor coupling one of the two supply lines and blower ground,
   a second capacitor coupling the other of the two supply lines and blower ground, and wherein the first and second capacitors cooperate to filter common mode EMI without the aid of an inductor.

8. The apparatus of claim 7, wherein the housing includes a mounting bracket which acts as a chassis ground bus.

9. The apparatus of claim 7, further comprising a third capacitor coupling the two supply lines.

10. The apparatus of claim 8, wherein the blower is isolated from the mounting bracket.

11. The apparatus of claim 10, further comprising a substantially radio-opaque blower case and a motor controller received within the blower case.

12. A method of reducing conductive EMI emissions and ground leakage current of a blower for medical equipment powered by a two line current supply, the method comprising the steps of:
   connecting a blower for operation to the two line power supply,
   providing a housing,
   isolating the blower from the housing to define a blower ground isolated from chassis ground,
   capacitively coupling each of the supply lines to blower ground, and
   filtering common mode EMI with the first and second capacitors without the aid of an inductor.

13. The method of claim 12, further comprising the step of capacitively coupling the supply lines to each other.

14. The method of claim 12, wherein the supplied housing includes a conductive mounting bracket and further comprising the steps of providing a power supply having a ground conductor coupled to earth ground, and coupling the mounting bracket to the ground conductor.

* * * * *